J. F. O'CONNOR.
FRICTION DRAFT RIGGING.
APPLICATION FILED DEC. 28, 1910.
994,779.
Patented June 13, 1911.
3 SHEETS—SHEET 1.
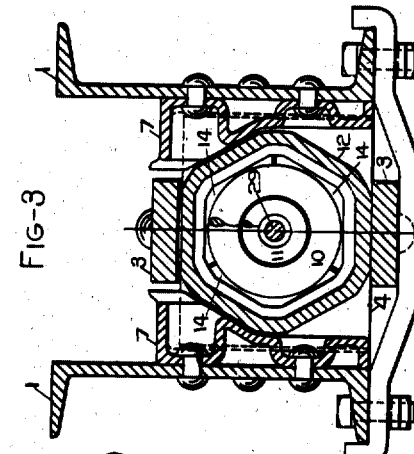
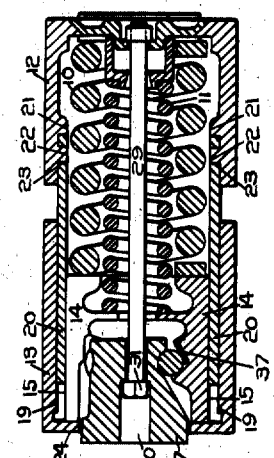
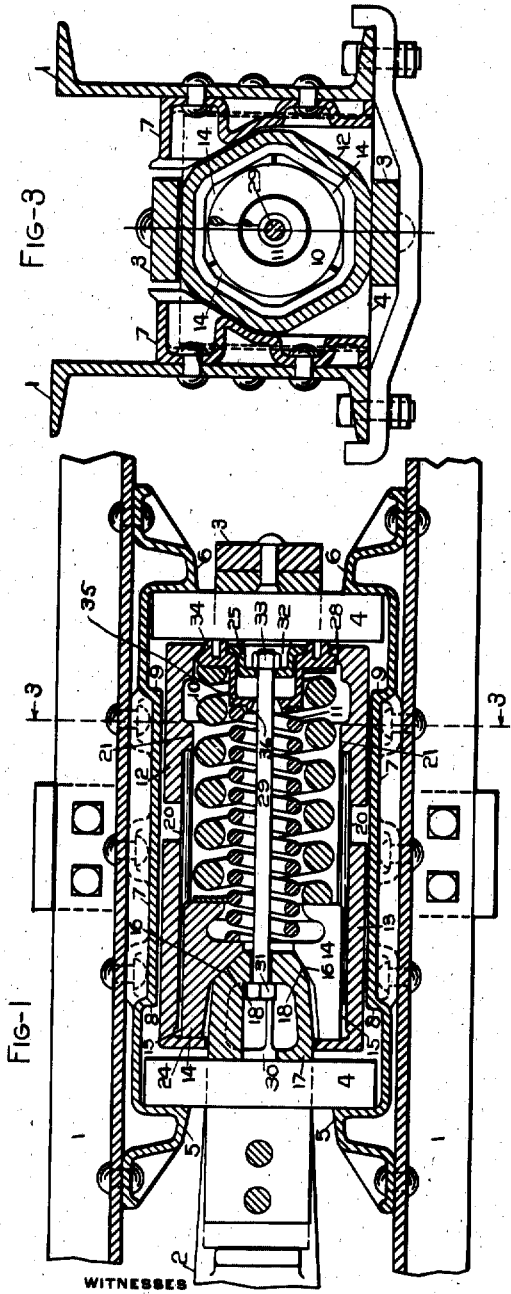
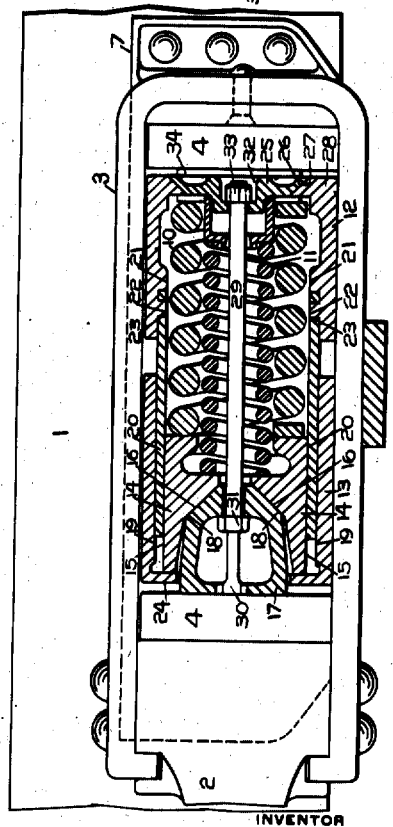
WITNESSES
Calvin B. Patch
Esther Abrams
INVENTOR
John F. O'Connor
by Munday, Evarts, Adcock & Clarke
his attorneys

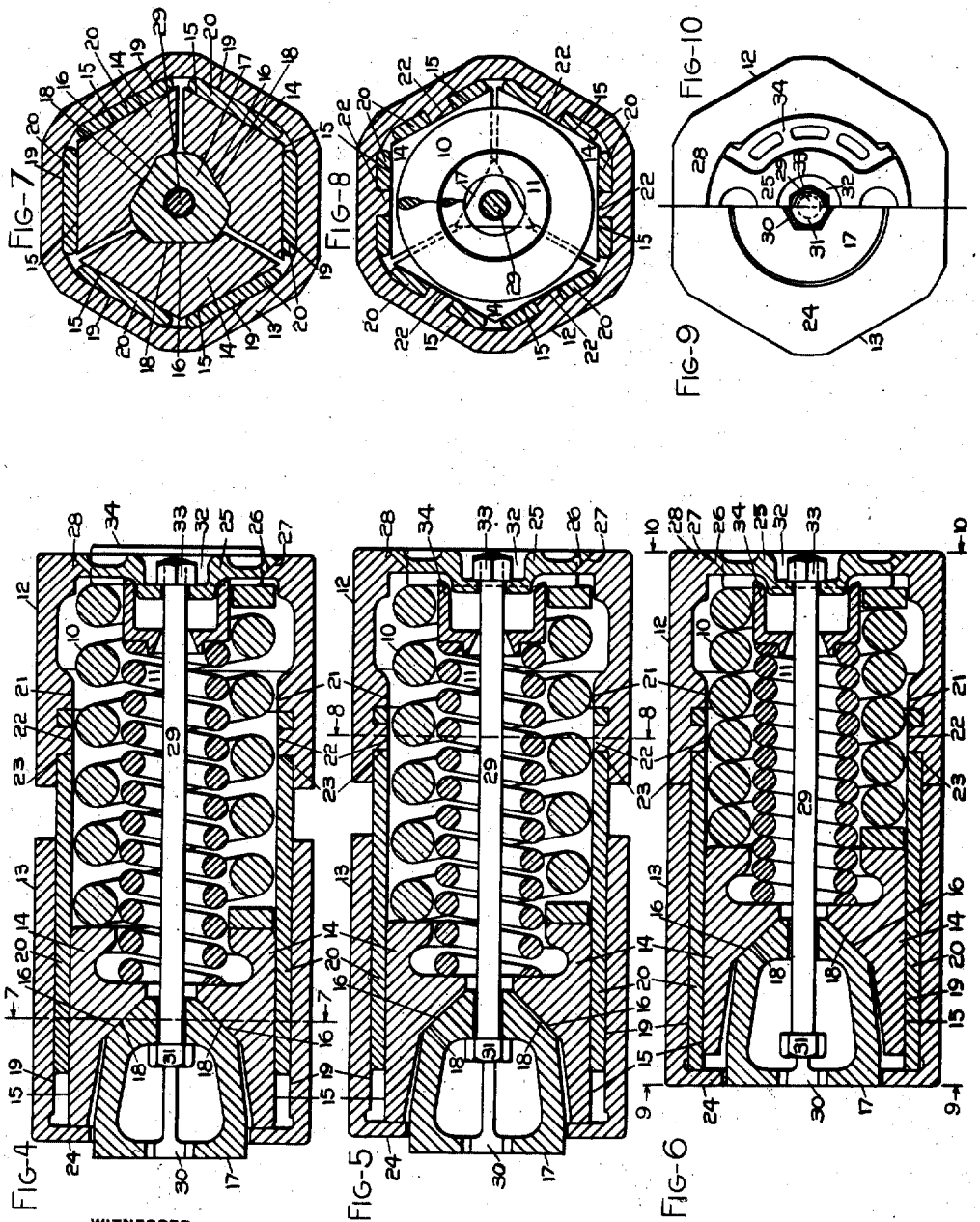

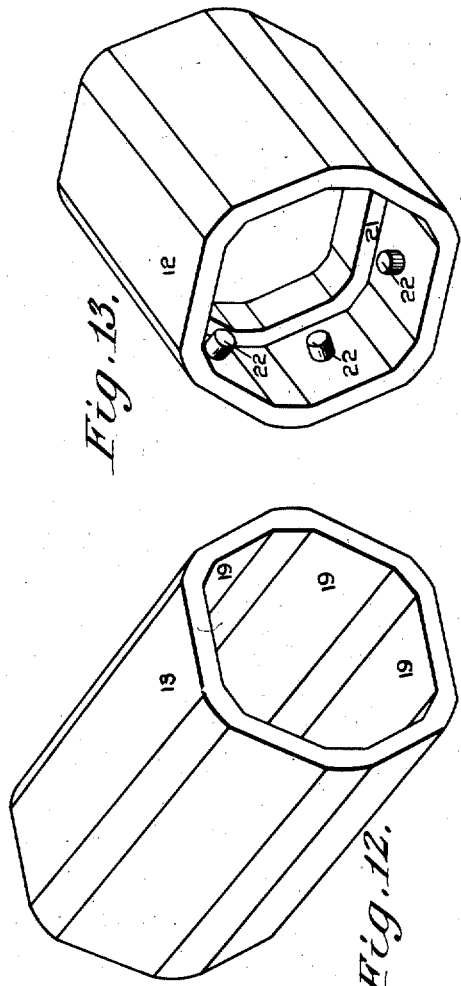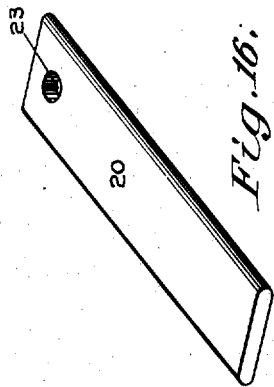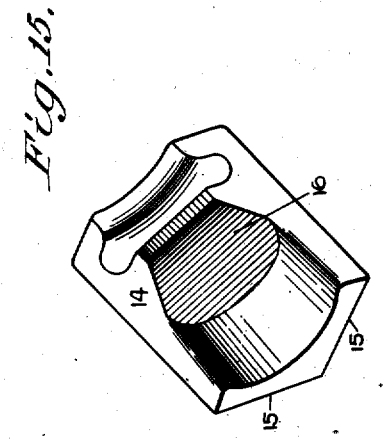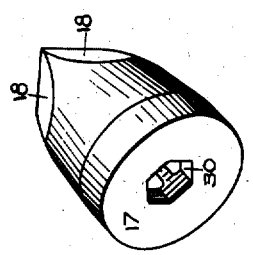

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

FRICTION DRAFT-RIGGING.

994,779.

Specification of Letters Patent.   Patented June 13, 1911.

Application filed December 26, 1910. Serial No. 599,753.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

My invention relates to improvements in friction draft rigging.

The object of my invention is to provide a friction draft rigging of a strong, simple, efficient and durable construction, which will be of relatively high cushioning capacity and at the same time adapted to properly and certainly release without danger of sticking, and in which all the frictional parts or elements may be made of relatively cheap material without special hardening, thus adapting the gear to be manufactured at small cost and to be furnished at a low price. To practically accomplish this object or result, and herein my invention consists, I combine with the draw-bar, followers, spring, spring cage, friction shell, friction shoes and wedge, supplemental parallel faced friction plates which are interposed between the friction faces of the shoes and shell and abut at one end against the spring cage, the friction shell and spring being normally, or when the spring is expanded, spaced apart, so that a sliding frictional movement may take place between the supplemental friction plates and the friction shell, and also between the friction shoes and the supplemental plates; thus creating a double friction, and thereby producing a friction gear of relatively high cushioning capacity by use of a wedge which is sufficiently blunt to insure a proper, certain and reliable release action. The friction shell being made as customary of malleable iron, this enables me to make the supplemental friction plates of a relatively cheap material such as ordinary spring steel, and the friction shoes and wedge of malleable iron.

My invention also consists in the novel construction of parts and devices and in the novel combinations of parts and devices herein shown and described and more particularly specified in the claims.

In the drawing, Figure 1 is a plan view, partly in horizontal section of a friction draft rigging embodying my invention. Fig. 2 is a side elevation. Fig. 3 is a vertical section on line 3—3 of Fig. 1. Fig. 4 is a detail, central, longitudinal section of the friction shell, spring cage and contained parts, showing the same in their normal or expanded position. Fig. 5 is a similar view, showing the same partially compressed or under preliminary compression. Fig. 6 is a similar view showing the parts fully compressed. Fig. 7 is a detail cross section on line 7—7 of Fig. 4. Fig. 8 is a detail cross section on line 8—8 of Fig. 5. Fig. 9 is a partial end elevation, looking from line 9—9 of Fig. 6 and Fig. 10 is a partial end elevation loking from line 10—10 of Fig. 6. Fig. 11 is a central, longitudinal section, illustrating a modification in which to increase the cushioning capacity of the draft rigging, the wedge is made more acute and anti-friction rollers are interposed between the wedge faces of the wedge and friction shoes, the friction shoes having inserted hardened steel wear plates for the anti-friction rollers to bear against. Figs. 12, 13, 14, 15 and 16 are detail perspective views of the friction shell, spring cage, wedge, one of the friction shoes and one of the friction plates, respectively.

In the drawing, 1, 1 represent center sills or other frame members of the car to which the draft rigging is applied, 2 the draw-bar, 3 the draft yoke, 4 the followers, 5, 6 draft lugs or stop shoulders for the followers to abut against, the same being preferably formed on integral cheek plates 7, 7, which are also furnished with limiting stops or shoulders 8, 9 to limit the movement of the followers and the compression of the cushioning mechanism. The spring 10 preferably has a smaller spring 11 nesting within it. The spring 10 fits at its rear end within the spring cage 12 which is normally spaced apart at its front end from the friction shell 13. At their front ends, the springs 10, 11 abut against the friction shoes 14, which are preferably three in number, and furnished with external friction faces 15 and each with an inner wedge face 16 which is acted upon by the wedge 17, the same preferably having three wedge faces 18 or for one of each of the friction shoes. The friction shell 13 is preferably hexagonal in cross section and has internal flat longitudinally extending wedge faces 19.

20 are supplemental parallel faced friction plates which are interposed between the flat, longitudinally extending friction faces of the friction shell and friction shoes, and which have a sliding frictional engagement with both the friction shell and shoes. The supplemental friction plates abut at one end against a shoulder 21 on the spring cage, the spring cage having also lugs 22 which enter holes 23 in the supplemental friction plates to connect the same with the spring cage.

The friction shell 13 has at its front end a flange or shoulder 24 adapted to engage the front end of the friction shoes, and thus cause the friction shell to be returned to normal position with the shoes in the release movement under expansion of the compressed spring.

The spring cage 12 at its rear end is furnished with a cap 25, preferably having a bevel face 26 engaging a bevel face 27 of the flange 28 at the rear end of the spring cage. The cap 25 is connected by a rod 29 with the wedge 17, the wedge having a cavity 30 to receive the head 31 of the connecting rod, and the cap 25 having a recess 32 to receive the nut 33 of the connecting rod. A preliminary compression follower 34 is preferably interposed between the rear end of the springs 10 and 11 and the rear follower to provide for a limited preliminary compression of the springs before the friction cushioning mechanism is brought into action. To properly support and center the rear end of the inner spring 11, a spring seat 35 having a boss 36 for engagement with the spring 11 is mounted upon the connecting rod 29, the same preferably being made integral with the preliminary compression follower 34.

In operation under either pulling or buffing strains, the first action of the draw-bar movement is to force the preliminary compression follower 34 inward flush with the rear face of the spring cage 12 and its cap 25, as shown in Fig. 5. Further movement of the draw-bar causes the friction shoes under expansion of the wedge to further compress the spring and to frictionally slide in respect to the interposed supplemental friction plates 20, and also to cause the friction shell 13 to frictionally slide on and against the supplemental friction plates, thus creating a double friction and a relatively high cushioning capacity with a relatively blunt wedge 17, the wedge faces of which are sufficiently blunt to always secure a certain and reliable release action.

In the modification illustrated in Fig. 11, the wedge is made more acute, and anti-friction rollers are interposed between the wedge and the friction shoes, the friction shoes being furnished with inserted hardened steel wear plates 37 on either inclined or wedging faces for the anti-friction rollers to bear against. In this construction, the wedge is made of hard material, such as white cast iron or steel, the friction shoes and friction shell being, as in the first described construction, of malleable iron.

I claim:—

1. In a friction draft rigging, the combination with the draw-bar, draft yoke and followers, of a spring cage and spring, a friction shell, friction shoes and wedge within the shell, and parallel faced supplemental friction plates interposed between the friction shell and friction shoes, and having a frictional action and engagement with both the friction shell and shoes, substantially as specified.

2. In a friction draft rigging, the combination with the draw-bar, draft yoke and followers, of a spring cage and spring, a friction shell, friction shoes and wedge within the shell, and parallel faced supplemental friction plates interposed between the friction shell and friction shoes, and having a frictional action and engagement with both the friction shell and shoes, the friction shell having a shoulder against which said supplemental friction plates abut at one end, substantially as specified.

3. In a friction draft rigging, the combination with the draw-bar, draft yoke and followers, of a spring cage and spring, a friction shell, friction shoes and wedge within the shell, and parallel faced supplemental friction plates interposed between the friction shell and friction shoes, and having a frictional action and engagement with both the friction shell and shoes, the friction shell having a shoulder against which said supplemental friction plates abut at one end, and also having lugs engaging openings in the friction plates to connect the friction plates to the spring cage, substantially as specified.

4. In a friction draft rigging, the combination with a spring and spring cage, of a friction shell, friction shoes and wedge, the friction shoes and shell having a plurality of parallel longitudinally extending flat friction faces and supplemental friction plates interposed between the friction shoes and shell, and having parallel friction faces in sliding frictional engagement with the shell and shoes, the friction shell having a shoulder at one end adapted to engage the adjacent end of the friction shoes, substantially as specified.

5. In a friction draft rigging, the combination with a spring cage, friction shell, friction shoes and wedge, of a spring reacting at one end against the spring cage and at the other end against the friction shoes, and supplemental parallel faced friction plates interposed between the friction shell and friction shoes and abutting at one end against the spring cage, substantially as specified.

6. In a friction draft rigging, the combination with a hexagonal friction shell having internal, longitudinally extending flat friction faces, a plurality of friction shoes each having a pair of external longitudinally extending flat friction faces and an internal wedge face, the wedge having wedge faces engaging the wedge faces of said friction shoes, and a plurality of parallel faced friction plates interposed between the friction faces of said shell and shoes and abutting at one end against the spring cage, substantially as specified.

JOHN F. O'CONNOR.

Witnesses:
 EDMUND ADCOCK,
 PEARL ABRAMS.